US008487249B2

(12) United States Patent
Gershman et al.

(10) Patent No.: US 8,487,249 B2
(45) Date of Patent: Jul. 16, 2013

(54) AUXILIARY FREQUENCY PARAMETRIC EXCITATION OF QUADRUPOLE MASS SPECTROMETERS

(75) Inventors: Daniel Gershman, Ann Arbor, MI (US); Bruce Block, Ann Arbor, MI (US); Martin Rubin, Ann Arbor, MI (US); Thomas Zurbuchen, Ann Arbor, MI (US)

(73) Assignee: The Regents of the University of Michigan Office of Technology Transfer, Ann Arbor, MI (US)

( * ) Notice: Subject to any disclaimer, the term of this patent is extended or adjusted under 35 U.S.C. 154(b) by 103 days.

(21) Appl. No.: 13/326,085

(22) Filed: Dec. 14, 2011

(65) Prior Publication Data

US 2012/0145892 A1 Jun. 14, 2012

Related U.S. Application Data

(60) Provisional application No. 61/422,929, filed on Dec. 14, 2010.

(51) Int. Cl.
*H01J 49/34* (2006.01)
*H01J 49/42* (2006.01)
*B01D 59/44* (2006.01)

(52) U.S. Cl.
USPC ............................ 250/293; 250/290; 250/282

(58) Field of Classification Search
USPC .......................... 250/281–283, 288, 290–293
See application file for complete search history.

(56) References Cited

U.S. PATENT DOCUMENTS

| | | | | |
|---|---|---|---|---|
| 5,598,001 | A | 1/1997 | Flory et al. | |
| 5,672,870 | A | 9/1997 | Flory et al. | |
| 6,075,244 | A | 6/2000 | Baba et al. | |
| 6,713,757 | B2 * | 3/2004 | Tanner et al. | 250/288 |
| 7,772,550 | B2 * | 8/2010 | Schaefer et al. | 250/290 |
| 2005/0274887 | A1 | 12/2005 | Weiss et al. | |
| 2008/0001083 | A1 * | 1/2008 | Schaefer et al. | 250/290 |

OTHER PUBLICATIONS

International Search Report & Written Opinion from International Application No. PCT/US2011/064931 dated Aug. 3, 2012.

Konenkov, N. V., et al. Matrix methods for the calculation of stability diagrams in quadrupole mass spectrometry J. Am. Soc. Mass Spectrom. 13(6), 597 (2002).

Konenkov, N. V., et al. Upper stability island of the quadrupole mass filter with amplitude modulation of the applied voltages J. Am. Soc. Mass Spectrom. 16(3), 379 (2005).

March, R. E. An Introduction to Quadrupole Ion Trap Mass Spectrometry J. Mass Spectr. 32(4), 351 (1997).

Konenkov, N. V., et al. Quadrupole mass filter operation with auxiliary quadrupolar excitation: theory and experiment Int. J. Mass Spectrom. 208(1-3), 17 (2001).

Zhao, XZ., et al. Overcoming Field Imperfections of Quadrupole Mass Filters with Mass Analysis in Islands of Stability Anal. Chem. 81(14), 5806 (2009).

* cited by examiner

*Primary Examiner* — Bernard E Souw

(74) *Attorney, Agent, or Firm* — Marshall, Gerstein & Borun LLP

(57) ABSTRACT

The apparatus introduces a second adjustable resonant point in a QMS at a frequency that is close to a multiple of the fundamental frequency by adjusting driving point impedance characteristics of the QMS. The apparatus measures the first and second resonant point of the QMS to account for changes in the operational characteristics of the QMS.

23 Claims, 7 Drawing Sheets

AUXILIARY FREQUENCY PARAMETRIC EXCITATION OF QUADRUPOLE MASS SPECTROMETERS

CROSS-REFERENCES TO RELATED APPLICATION

The present application claims the benefit of U.S. Provisional Patent Application No. 61/422,929 entitled "Auxiliary Frequency Parametric Excitation of Quadrupole Mass Spectrophotometers" filed on Dec. 14, 2010, which is hereby incorporated by reference herein in its entirety.

STATEMENT OF GOVERNMENT INTEREST

This invention was made with government support under NNX08AO05G and NNX09AL50H awarded by the National Space and Aeronautics Administration (NASA). The government has certain rights in the invention.

FIELD OF THE INVENTION

This disclosure relates generally to mass spectrometry and, more particularly, to a system for creating practical parametric excitation of quadrupole mass spectrometers (QMS) at auxiliary frequencies for enhanced resolution.

BACKGROUND OF THE DISCLOSURE

A mass spectrometer is an instrument used to measure the mass, or more specifically the mass to charge ratio, of ionized atoms or electrically charged particles. Mass spectrometers help determine the composition of an unknown sample by isolating ionized atoms based on their mass-to-charge ratio, measured in Atomic Mass Units per charge (AMU/q). Mass spectrometers find widespread application in the basic sciences, medicine, and space-based research. Two common space-related applications of mass spectrometry are the study of the composition of planetary atmospheres and the monitoring of air quality on manned space missions. Although mass spectrometry has been used in space-related applications for many years, usage in space presents unique design challenges, both in terms of detection sensitivity and logistical considerations such as weight and power requirements.

In early mass spectrometers, atoms or molecules were ionized by a hot filament and accelerated through the instrument under the influence of voltage gradients. The ions followed a semi-circular trajectory through the instrument, which utilized a strong magnetic field to selectively direct ions of a specific mass towards a detector. By controlling the strength of the magnetic field and the accelerating voltage, ions of different mass/charge ratios could be selectively guided towards the detector. These early mass spectrometers suffered from numerous deficiencies and drawbacks, most significantly the difficulty in achieving and maintaining a stable magnetic field.

Quadrupole mass spectrometers (QMS) eliminated the need for magnetic fields. Similar to its predecessor, a QMS employs a hot filament to ionize the atoms or molecules. Ionization results from the conversion of normally neutral atoms or molecules to electrically charged particles. The ions are accelerated through a mass filter having four parallel metal rods, referred to as the quadrupole. DC and RF (frequency Ω) voltages are applied to opposing pairs of these rods with opposite polarities to create an electric field inside the rod assembly. For a given DC and RF voltage, only ions of a certain mass-to-charge ratio will pass through the quadrupole filter, while all other ions are thrown out of their original path. The stability region is defined by ion trajectories that are periodic and bounded. A detector placed at the end of the rod assembly opposite the ionizer measures those ions that pass through the quadrupole filter. A mass spectrum is obtained at the detector by measuring the ions passing through the quadrupole filter as the voltages on the quadrupole rods are varied. The mass resolution of the QMS is the maximum atomic mass that can be distinguished. The maximum attainable resolution is determined by both the fidelity of the electronics and the overall tolerances of the instrument design. Generally, the voltages employed in QMS systems are of the order of a few thousand volts to obtain a mass resolution of a few hundred Daltons.

The quadrupole rods can be a circular or hyperbolic. Circular rods are easier to manufacture and consequently cheaper. However, the quadrupole electric field produced with circular rods is slightly distorted, which can reduce the maximum attainable mass resolution of the instrument. Consequently, in applications requiring high mass resolution, the more difficult and expensive to manufacture hyperbolic rods are employed as quadrupole rods.

To improve resolution, the electric field generated by the quadrupole rods can be perturbed by introducing an excitation RF signal at an auxiliary frequency (ω) different from the fundamental frequency (Ω). This perturbation causes the original stability region to break into smaller regions termed islands, including an 'upper stability island.' The result of this auxiliary frequency is the creation of bands of instability in the previously stable regions of the electric field. Charged particles having a mass within a certain range that previously passed through a stable region of the electric field may now be thrown off trajectory as they coincide with these islands of instability. In this way, the use of an auxiliary frequency to drive the quadrupole rods allows a QMS to operate with improved resolution. A QMS driven under an auxiliary frequency excitation is able to better differentiate between charged particles having close, yet different masses, or mass-to-charge ratios. The size and shape of the upper stability island is determined by the auxiliary frequency used and the amplitude of the excitation RF signal. To create an island of appropriate size, for example, the auxiliary frequency (ω) inserted into the QMS system needs to be near an integer multiple of the fundamental RF frequency (i.e., ω=0-0.1Ω, 0.9-1.1Ω, 1.9-2.1Ω, etc.). Employing an excitation RF signal in one of these auxiliary frequency ranges in conjunction with the DC voltage U and the RF voltage V allows for improved resolution and discrimination between ions with small differences in their mass-to-charge ratio. In general, the auxiliary signal amplitude required for appropriate island formation increases with auxiliary signal frequency.

Unfortunately, this use of auxiliary frequency excitation presents problems in constrained applications, such as space-based applications, where it is advantageous for the QMS to have increased sensitivity and enhanced resolution to better detect and differentiate between complex molecules with higher masses. Having to excite the quadrupoles with an excitation RF signal at an auxiliary frequency in order to create islands of stability/instability requires higher power and increased complexity of the voltage control system. Additionally, the excitation RF signal must be driven at an amplitude that corresponds to a few hundred volts (~10% of the fundamental RF signal amplitude), to create islands of the appropriate size. However, in space-based applications, power and size is at a premium.

Other factors that affect the resolution and accuracy of the measurement made by the QMS are imperfections in the rods and limitations of the electronics. Furthermore, electronic component values drift with temperature and time, which can have the material effect of shifting the operating point of the quadrupole sufficiently to degrade the detected mass spectrum.

Thus there exists a need to enable a QMS to resolve species of heavy, complex molecules in a power efficient manner, but also to improve the tolerance of the instrument to variations in electronic component values.

SUMMARY OF THE DISCLOSURE

One aspect of the disclosure exploits the characteristic resonant properties of the QMS to increase the dynamic range of the excitation voltage amplitudes used for stability island formation by operating at high ($\omega$=1.9$\Omega$-2.1$\Omega$) auxiliary frequencies. Another aspect of the disclosure is the insertion of an additional resonance at a desired auxiliary frequency ($\omega$) into the QMS by the introduction of a resistive-inductive-capacitive (RLC) tank circuit, to allow for the creation of appropriately sized islands of stability using less power than other conventional techniques. The additional resonance enables power-efficient excitation of the QMS at the auxiliary frequency ($\omega$). Another aspect of the disclosure employs combinations of RLC networks within the resonant tank circuit of the QMS to selectively create different resonance at any number of desired auxiliary frequencies ($\omega$). With the present techniques, these ratios of $\omega/\Omega$ may be maintained at higher frequencies, e.g., 2, 3, 4, and 5$\Omega$, while still achieving an improvement in the power efficiency in comparison to conventional notions. Yet another aspect of the disclosure is to implement a feedback circuit to dynamically control amplitudes of all frequency components.

In an embodiment, a method of isolating a sample characterized by a characteristic atomic mass unit value using a quadrupole assembly, the method includes: injecting the sample into the quadrupole assembly, where the quadrupole assembly is formed of two pairs of opposing quadrupole rods; and adjusting the impedance characteristic of the quadrupole rods to set a first resonant point and a second resonant point for the quadrupole assembly, such that the first resonant point substantially corresponds to a first resonant frequency of the quadrupole assembly and such that the second resonant point substantially corresponds to a second resonant frequency of the quadrupole assembly, wherein the second resonant frequency is different than first resonant frequency.

In another embodiment, an apparatus to control a Quadrupole Mass Spectrometer (QMS), the apparatus includes: an impedance network to receive a drive excitation signal to provide power to the QMS and to produce a frequency-dependent power usage level feedback signal; and a controller configured to transmit the drive excitation to the impedance network, wherein the controller is coupled to receive the frequency-dependent power usage level feedback signal and wherein the controller controls the amplitude component of the drive excitation signal.

In yet another embodiment, a method for energizing a multi-resonant tank circuit with a composite signal, the multi-resonant tank circuit comprising a plurality of components wherein the plurality of components include a multiplicity of capacitive elements and a plurality of inductive elements, the method includes: generating a first signal having a first frequency, wherein the first frequency corresponds to a first resonant frequency of the multi-resonant tank circuit, and wherein the first signal is generated from a clock source; generating a second signal having a second frequency, wherein the second frequency corresponds to a second resonant frequency of the multi-resonant tank circuit, and wherein the second signal is generated from the clock source; synthesizing a composite signal by utilizing the first signal and the second signal; and coupling the composite signal to the multi-resonant tank circuit thereby causing the multi-resonant tank circuit to be energized at, at least the first resonant frequency and the second resonant frequency.

DETAILED DESCRIPTION OF PREFERRED EMBODIMENTS

An example implementation includes a feedback control system to enable a QMS to efficiently achieve increased range, accuracy, and resolution at desired $\omega/\Omega$ ratios. The system achieves this by tuning the frequency dependent characteristics of the QMS at the desired fundamental frequency $\Omega$ and at the auxiliary frequency $\omega$. A closed-loop tuning improves the stability of the measurement by adjusting for temporal drifts in the operating characteristics of the QMS and variations in operating temperature.

Figure 1:
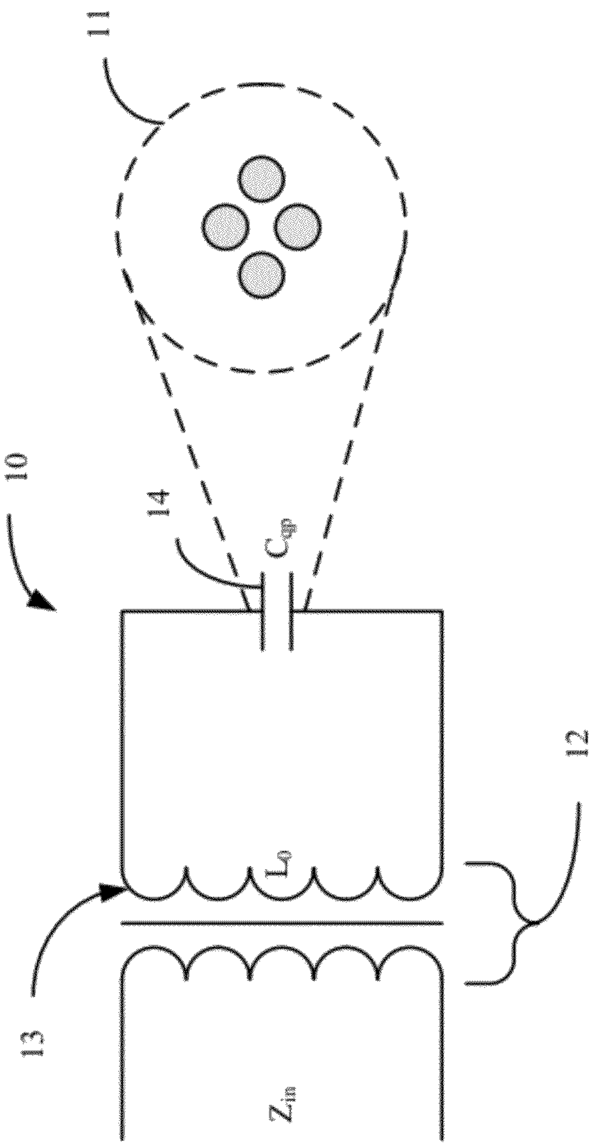
FIG. 1 illustrates an example circuit of a pair of conducting rods used to create the electric field in the QMS.

FIG. 1 is a circuit schematic representation of an example tank circuit 10. The tank circuit 10 is comprised of a secondary coil (inductor) 13 of transformer 12, the secondary coil 13 having an inductance $L_o$ and a representative capacitive element 14 having a capacitance $C_{qp}$. The capacitive element 14 represents a capacitor formed by pairs of conducting rods 11 used to create an electric field in an example QMS system and the capacitance $C_{qp}$ represents the intra-quadrupole rod capacitance between the pairs of quadrupole rods, where a QMS system is formed of two such pairs. $Z_{in}$ represents the input impedance of the tank circuit 10.

The representative capacitive element 14 and the secondary coil 13 each have frequency dependent and frequency independent impedance components. The tank circuit 10 operates power efficiently when the frequency dependant impedance of the inductor 13 and the capacitive element 14 are close to each other or equal. At a characteristic frequency of the tank circuit 10, the frequency dependent capacitive and inductive impedances cancel each other. The frequency at which this occurs is the resonant frequency, $f_0$, of the tank circuit 10. Driving an electrical signal through the tank circuit 10 or energizing the tank circuit 10 with an electrical signal at the resonant frequency $f_0$ is generally considered most efficient, from a power utilization perspective. Thus, by selecting the fundamental frequency $\Omega$ of an RF signal used to energize the QMS to be as close to the characteristic resonant frequency $f_0$ of the tank circuit 10 (comprising the intra-quadrupole rod capacitance $C_{qp}$ and the inductor 13 of inductance $L_o$), the efficient generation of appropriate voltages across the quadrupole rods 11 is assured. Preferably, the fundamental frequency Ω substantially corresponds to the characteristic resonant frequency $f_0$ of the circuit by being within a frequency range such that the impedance of the tank circuit is within its −3 dB value of the peak impedance value at $f_0$. This corresponds to a frequency range of 0.9 to 1.1 times $f_0$.

However, improving QMS instrument resolution, by creating islands of stability involves, in addition to energizing the QMS with the RF signal of frequency Ω, energizing the QMS with an RF signal at an auxiliary frequency ω that is preferably near, and not necessarily exactly at some integer multiple of the fundamental frequency Ω. However, when driving the tank circuit 10 with the RF signal at the auxiliary frequency ω the frequency dependent impedance of the inductor 13 and capacitive element 14 comprising intra-quadrupole rod capacitance $C_{qp}$ do not cancel each other. Consequently, the tank circuit 10 presents a substantial impedance to the RF signal at the auxiliary frequency ω, thus expending higher levels of power to produce the desired auxiliary excitation. In space-related applications providing this higher power is prohibitively expensive and impractical. Even selecting the auxiliary frequency ω to be close to the fundamental RF frequency Ω and the resonant frequency $f_0$ of the circuit can require significant power levels.

Figure 2:
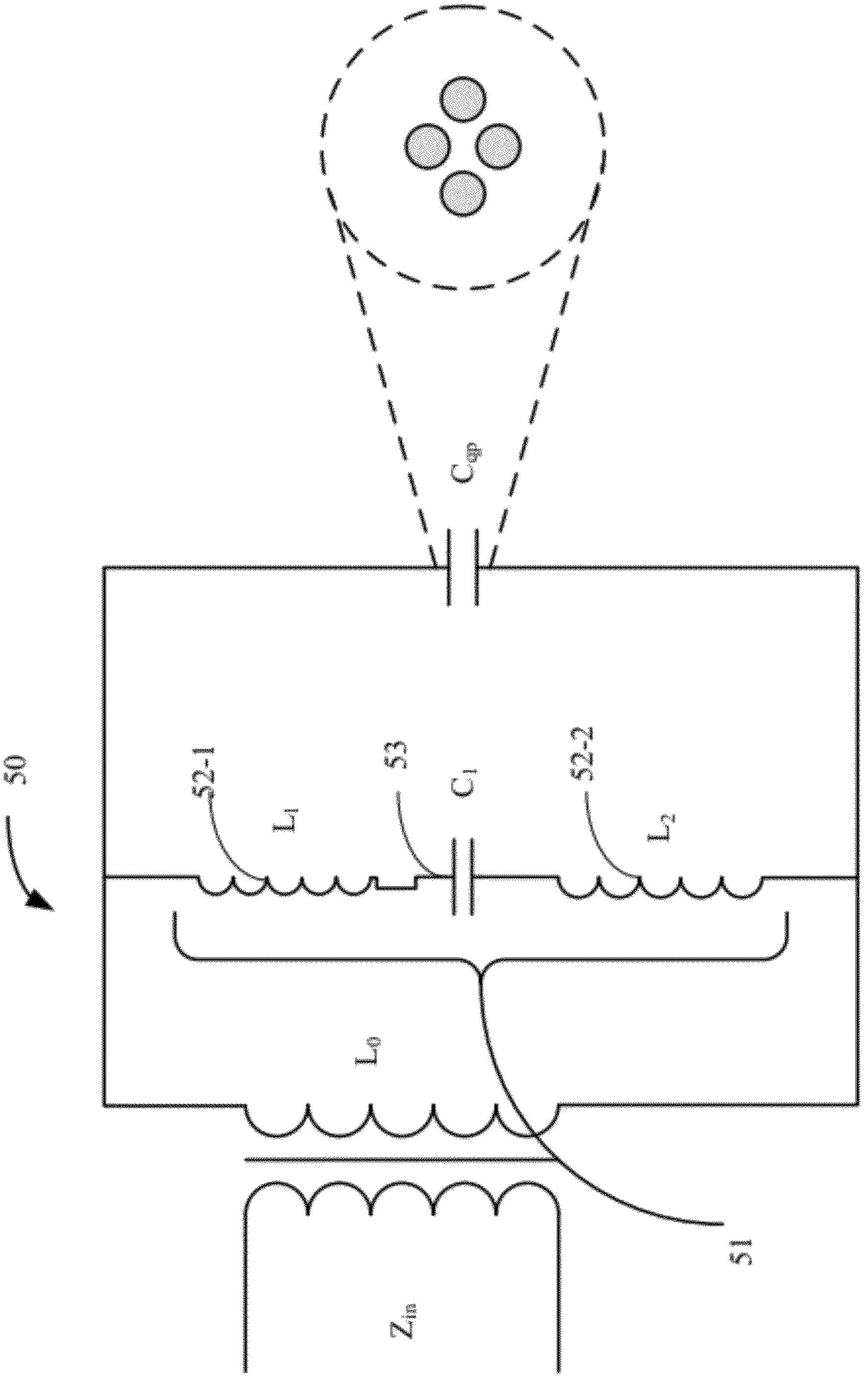
FIG. 2 represents an example where a second LC circuit is introduced in parallel with a pair of quadrupoles.

In an example implementation, to ameliorate the previously described shortcomings of the current QMS technology, a series LC circuit 51 comprising inductive elements 52-1 and 52-2 having inductances $L_1$ and $L_2$ respectively and capacitive element 53 having capacitance $C_1$ is electrically connected in parallel with the representative capacitive element 54 having capacitance $C_{qp}$, which is representative of the intra-quadrupole rod capacitance contributed by the quadrupole rods of the QMS, as depicted in FIG. 2. The inductive values $L_1$ and $L_2$ and the capacitance $C_1$ are determined using circuit synthesis techniques, for example Foster's reactance theorem of the $2^{nd}$ kind. The circuit synthesis technique is appropriately configured or constrained in a manner such that the determined inductive values $L_1$ and $L_2$ and the capacitance $C_1$ will result in a tank circuit 50 that has one resonant frequency at $f_0$, which is equal or close to the RF signal of fundamental frequency Ω, and a secondary resonant frequency at $f_1$, which is equal or close to the RF signal of the auxiliary frequency ω. The tank circuit 50 may be referred to as a "multi-resonant" tank circuit, in part, because tank circuit 50 has a first resonant frequency at $f_0$ and a second resonant at $f_1$.

In this example, energizing the tank circuit 50 with a composite signal comprising a RF signal at fundamental frequency Ω and excitation RF signal at auxiliary frequency ω will produce appropriate voltage drops at reduced power across the quadrupole rods because $c=f_0$ and $\omega=f_1$. In the example, $L_1$, $L_2$ and $C_1$ are selected such that $\omega \approx 2^*\Omega$ to generate islands of stability which can improve the sensitivity of the instrument. The circuit synthesis can be performed on a computing device by employing any available signal processing or computational software application, MATLAB for example.

Figure 3:
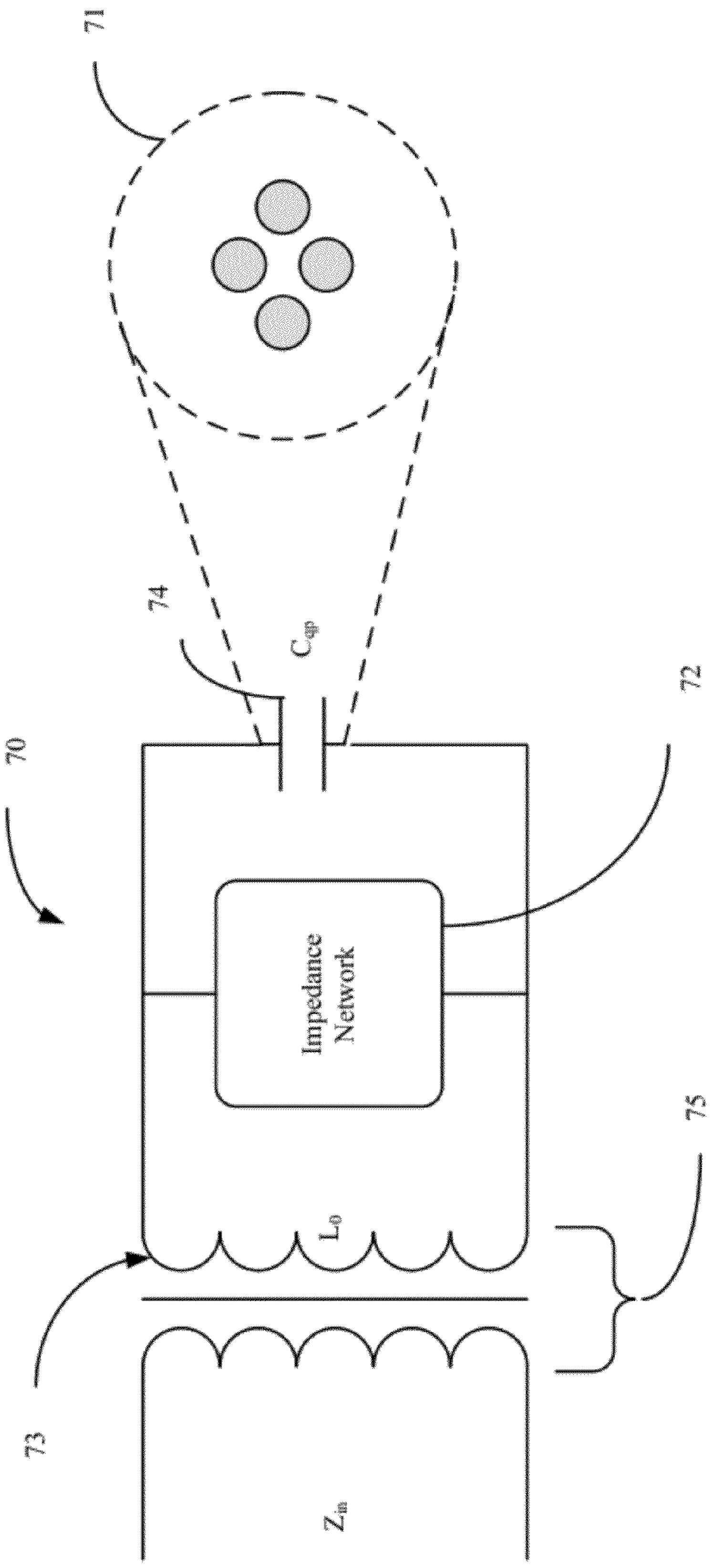
FIG. 3 is a block representation of another example, where the series LC circuit of FIG. 2 is replaced with an impedance network.

FIG. 3 is a schematic representation of another example of a tank circuit 70 where the LC circuit 51 of FIG. 2 is replaced with an impedance network 72 comprising electrical elements (not shown) having electronically selectable and tunable inductance and capacitance values. By employing suitable circuit synthesis techniques, appropriate inductance and capacitance value may be determined so as to produce desired resonant frequency points in the tank circuit 70. Further, suitable combinations of capacitance and inductance values can be dynamically selected in the impedance network 72 to create a tank circuit 70 with any desired number of resonant frequencies. Thus, by engaging different capacitive and inductive values in the impedance network, the secondary resonant frequency, $f_1$, of the circuit can be changed allowing auxiliary frequency ω which ranges from 0Ω-0.1Ω, 0.9Ω-1.1Ω, 1.9Ω-2.1Ω, 2.9Ω-3.1Ω, etc. to be power-efficiently introduced into the QMS. Based on the electrical characteristics of the tank circuit 70, in this example, in part for power efficient operation, it is desirable if first resonant frequency, $f_0$, is related to the fundamental frequency Ω as (n+0.9)*Ω to (n+1.1)*Ω, where n is a whole number. Similarly, it is desirable if second resonant frequency, $f_1$, is related to the auxiliary frequency ω as (n+0.9)*ω to (n+1.1)*ω, where n is a whole number. Of course, the first resonant frequency, $f_0$ and the second resonant frequency, $f_1$ may be outside the range specified above in other examples. For example, the deviation window of 0.1 (i.e., Ω+/−0.1 and ω+/−0.1) may be replaced with another deviation window that is larger than or less than 0.1.

In one example the impedance network 72 may include a varactor diode, which may be adjusted by an external voltage source to adjust its capacitance allowing the second resonant frequency $f_1$ to be varied. This allows the power-efficient excitation of the QMS at the fundamental frequency Ω and RF signals at auxiliary frequency ω which range from 0Ω-0.1Ω, 0.9Ω-1.1Ω, 1.9Ω-2.1Ω, etc. In another example a combination of capacitance and inductance can be selected in the impedance network to generate more than two resonant points in the circuit.

Figure 4:
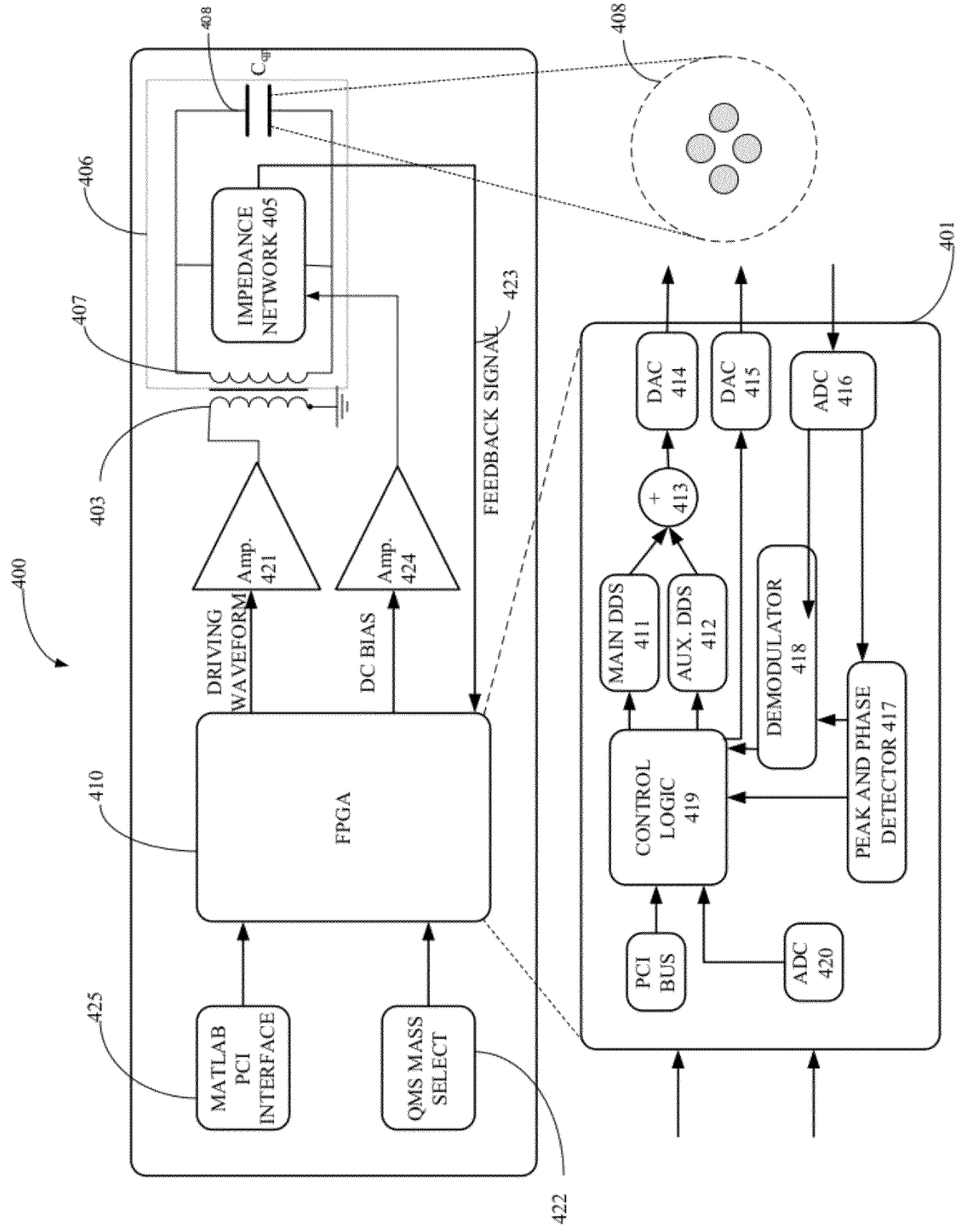
FIG. 4 is a block representation of an example multi-resonant tank circuit control system that may be used to control the operation of a QMS adapted with the impedance network of FIG. 3.

FIG. 4 is a schematic representation of another example electrical circuit 400, where an external controller 401 generates the RF signal at fundamental frequency Ω and the RF excitation signal at auxiliary frequencies ω. The controller 401 combines the two signals together with the DC voltage and excites the primary coil 403 of the transformer 404 of the QMS.

Simultaneously, the controller 401 selects inductance and capacitance values for the tunable electrical elements (not shown) in the impedance network 405 and engages the tunable electrical elements in the impedance network 405 so as to introduce the selected inductance and capacitance values into the tank circuit 406. The tank circuit 406, in this example, comprises the secondary coil 407 of the transformer 404, the inductive and capacitive elements selected in the impedance network 405 and the representative capacitive element 408 having capacitance $C_{qp}$, which is representative of the intra-quadrupole rod capacitance contributed by the quadrupole rods 409 of the QMS. As described with respect to FIG. 3, values of the inductive and capacitive elements selected in the impedance network 405 of the tank circuit 406 produce a tank circuit 406 that has a first resonant frequency at $f_0$ and a second resonant at $f_1$. By selecting appropriate inductance and capacitance values for impedance network 405, the controller 401 can ensure that the fundamental frequency Ω and auxiliary frequency ω of the generated RF signals are close or equal to the first resonant frequency at $f_0$ and a second resonant at $f_1$ of the tank circuit 406.

In this example, the controller 401 is implemented in a Field Programmable Gate Array (FPGA) device 410. Programmable logic primitives in the FPGA 410 synthesize the fundamental RF signal of frequency Ω in the main Direct Digital Synthesis (DDS) block 411 and the excitation RF signal of frequency ω in the auxiliary DDS block 412.

The FPGA 410 combines the two RF signals to generate a composite RF signal wherein the RF signal of auxiliary frequency ω "modulates" the RF signal of fundamental frequency Ω. The resulting composite RF signal drives the input of a linear amplifier 421. The linear amplifier 421 amplifies the signal level and increases the current drive. In another example the output impedance of the linear amplifier 421 is used to match input impedance presented by the primary coil 403 of the transformer 404. The FPGA separately introduces the DC voltage into the tank circuit 405, composed of the secondary coil 403 of the transformer 404, the impedance network 405 and the representative capacitance element 408 having capacitance $C_{qp}$, which is representative of the intra-quadrupole rod capacitance contributed by the quadrupole rods 409 of the QMS. In this example, the DC voltage is amplified by a second linear amplifier 424. In another example, a DC-DC converter (not shown) may be used to increase the voltage and current drive of the DC signal before introducing it into the tank circuit 405. Thus the FPGA may control power-efficient excitation of the QMS at the fundamental frequency Ω and RF signals at auxiliary frequency ω which range from 0-0.1Ω, 0.9-1.1Ω, 1.9-2.1Ω, etc.

The FPGA 410 reads a QMS mass selector input 422. The FPGA uses the settings on the QMS mass selector input 422 to determine the appropriate amplitudes for the RF signals generated at fundamental frequency Ω and auxiliary frequency ω. As previously explained, based on the amplitudes of the RF signals only ions having a mass corresponding to the mass selected by the QMS mass selector input 422 will pass through the islands of stability created in the electric field generated by the two pairs of quadrupoles rods 408. One will recognize that the FPGA 410 will energize (drive) both the pairs of quadrupole rods simultaneously; the only difference being that the second pair of quadrupoles will be driven with the opposite polarity.

In part, by utilizing the feedback signal 423, the FPGA 410 detects the voltage drop generated across the impedance network 405 at the fundamental frequency Ω and the auxiliary frequency ω, in response to energizing the tank circuit 406 with the composite RF signal and the DC signal. The FPGA may adjust the fundamental frequency Ω and auxiliary frequencies ω of the generated RF signals and amplitudes of the RF signals to maximize the voltage drop across the impedance network. Separately, the FPGA 410 may adjust the values for the inductive and capacitive elements in the impedance network 405.

In one of the examples, a separate computing device (not shown) generates the digital data required to synthesize the RF signals at fundamental frequency Ω, and the auxiliary frequency ω, using a signal processing software application such as MATLAB. The computing device provides this digital data to the FPGA 410. The FPGA uses this digital data to synthesize the RF signals at fundamental frequency Ω and the auxiliary frequency ω.

In one of the examples, the FPGA includes a control logic block 419 that communicates with the separate computing device executing the signal processing software application such as MATLAB via a PCI interface 425. In another embodiment, the control logic block 419 comprises logic to communicate with the computing device via a compact PCI interface or a USB interface or a Bluetooth interface or an ethernet interface or any other serial or parallel, wired or wireless interface architecture.

In one of the examples, the FPGA 410 includes DDS blocks. The main DDS logic block 411 generates the RF signal at the fundamental frequency Ω. The auxiliary DDS logic block 412 generates the RF excitation at the auxiliary frequency ω. An adder element 413 in the FPGA 410 combines the digital data generated by the main and auxiliary DDS logic blocks 411 412 of the FPGA. The combined digital data generated by the adder 413 drives the input of a digital-to-analog convertor (DAC) 414.

In some examples, the digital data driving the DAC 414 can be in a serial or parallel format and can be encoded in one's compliment, two's compliment or any other format that the DAC can accept. The analog output of the DAC 414 which is a composite RF signal constitutes the driving waveform that drives the linear amplifier 421.

In some examples the QMS mass selector input 422 is an analog signal that drives the input of the analog-to-digital convertor (ADC) 420. The level of the analog signal relates to the mass of the ions that are of interest. The control logic 419 utilizes the digital output of the ADC 420 to control the main and auxiliary DDS blocks 411 and 412 to generate the RF signals at the fundamental frequency Ω and auxiliary frequency ω corresponding to the QMS mass select.

One will recognize that the QMS mass selector input 422 can be automatically swept by an external device. In one of the examples, sweeping the QMS mass selector input causes the control logic 419 to vary the DC and RF voltages to produce a mass spectrum measurement. The control logic also generates the digital signals necessary to provide appropriate driving amplitudes of the RF signals at frequency Ω and auxiliary frequency ω.

The digital signals are converted by the DAC 414 to generate an analog signal that is used to drive the tank circuit 406 with the composite RF signal of frequency Ω and auxiliary frequency ω. In another example, a second analog signal from the DAC 415 adjusts the inductance or the capacitance or a combination of the inductance and the capacitance of the impedance network 405. In yet another example, the second analog signal will adjust a varactor diode to change the capacitance of the impedance network 405. In still another example, other types of variable capacitors and inductors, including digitally controlled variable capacitors or inductors can be used instead, to vary the impedance of the impedance network 405. One will recognize that level shifters and/or protocol convertors may need to be employed to maintain compatibility between the outputs and inputs of the FPGA 410 and external devices.

The linear amplifier 421 amplifies the driving waveform produced by the DAC 414. One skilled in the art will recognize that the linear amplifier 421 can be a discrete device using high power FET, BJT, or MOSFET transistor or integrated in an integrated circuit. In some examples, the gain of the linear amplifier 421 can be controlled by the control logic 419. In yet other examples 421, the linear amplifier is selected so that its output impedance is matched to the input impedance of the primary of the step-up transformer. One skilled in the art will recognize that other impedance matching techniques can be employed to reduce distortion.

Figure 5:
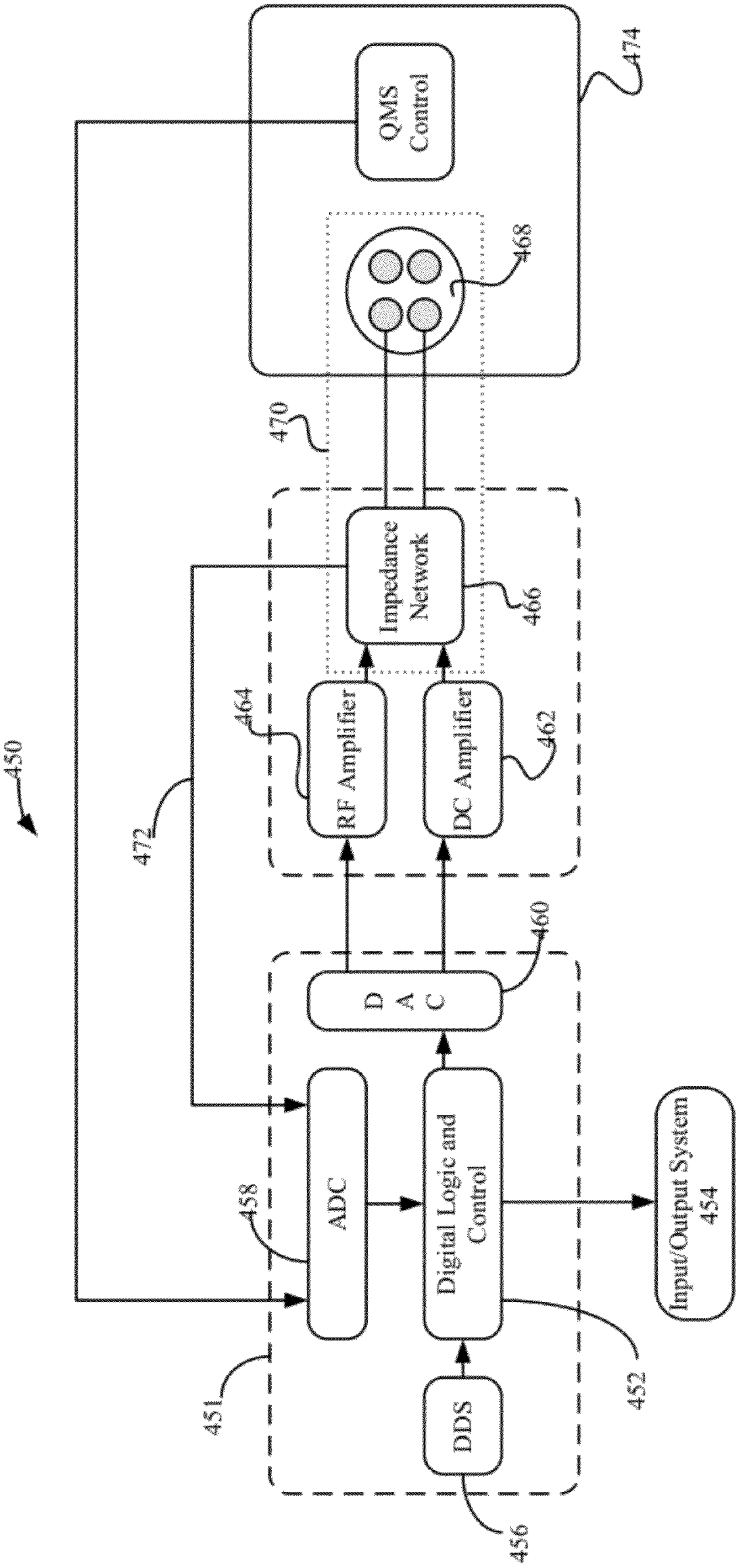
FIG. 5 is yet another example of a multi-resonant tank circuit control system that may be used to control the operation of a QMS adapted with the impedance network of FIG. 3.

Although in the example of FIG. 5, a linear amplifier 421 is utilize to amplify the driving waveform produced by the DAC 414, in other examples a non-linear amplifier may be utilized. Examples of such non-linear amplifiers include amplifiers configured to operate as class C amplifiers. Although an amplifier configured to operate as a class C amplifier may "clip" the driving waveform (the composite RF signal) thereby causing distortion, however when the amplifier is coupled to a resonant circuit such as tank circuit 405, distortion contributed by harmonics of the fundamental frequency and the auxiliary frequency are suppressed or filtered resulting in power efficient operation at the fundamental at frequency Ω and auxiliary frequency ω.

In some examples, the feedback line 423 is electrically connected from the impedance network 405 to the analog-to-digital convertor (ADC) 416. The signal on the feedback line 423 (feedback signal) is an electrical representation of the voltage drops across the quadrupole rods 407. For example, the feedback signal may indicate a frequency-dependent power usage level of the quadrupole assembly and thus provide a signal from which the control logic 419 may determine which particular amplitude on the auxiliary frequency value is optimum for most efficient power operation. In other examples, the feedback signal 423 may be determined in such a way that the apparatus may additionally, or separately, determine which auxiliary frequency, with a range of frequencies (e.g., 0.9-2.1Ω), is preferred for optimum operation.

The impedance network 405 is adapted with a tunable element to enable the control logic 419 to select a band of frequencies that are transmitted back on the feedback signal 423. The ADC 416 converts the feedback signal 423 to its digital representation. The output of the ADC 416 is connected to a peak and phase detector 417. In one example, the peak detector 417 determines the signal amplitudes of all frequency components as observed by the quadrupole rods. In another example, the control logic 419 ensures that maximum voltage drops occur at RF fundamental frequency Ω and RF excitation auxiliary frequency ω, by adjusting elements in the impedance network 405, as previously discussed.

In another example, the phase detector of the peak and phase detector block 417 detects the phase mismatch between the fundamental frequency Ω and RF excitation auxiliary frequency ω. One skilled in the art will recognize that phase differences between Ω and ω can affect the accuracy of the shape of the islands of instability in the electric field generated by the quadrupole rods. The control logic 419 block utilizes the output of the phase detector block to adjust the main and auxiliary DDS blocks 411 and 412 to maintain the RF fundamental and auxiliary signals in phase which each other.

One skilled in the art will recognize that the control logic block 419 implements a closed loop control system by adjusting the main and auxiliary DDS blocks 411 and 412, the gain of the linear amplifiers 421 and 424 and the values of capacitive and inductive elements in the impedance network 405 to ensure that the peak and phase detector block detect the appropriate voltage drop across the impedance network and the quadrupole rods 408 at fundamental frequency Ω and auxiliary frequency ω which corresponds to the mass selected at the QMS mass selector input 422.

In some examples, the computing device can automatically step the QMS mass selector through various mass setting under external program control. In this mode the QMS will generate a mass spectrum across the masses of interest.

In some examples, the computing device provides the FPGA 410 with the desired ω/Ω ratio and the control logic 419 of the FPGA 410 generates digital representation of RF signals at frequency Ω and auxiliary frequency ω in the main and auxiliary DDS 411 and 412 blocks.

In some examples, the control logic 419 utilizes phase locked loops (PLLs) to generate the RF signals at fundamental frequency Ω and auxiliary frequency ω. The control loop implements Fast Fourier Transforms (FFT) to filter the output of the PLLs to generate a sinusoidal representation of the RF fundamental and auxiliary signals at Ω and ω.

In other examples, the FPGA 410 may be replaced with a microcontroller board comprising a microcontroller that communicates with the QMS mass selector input 422 and the computing device via a PCI, compact PCI, USB, or other bus architecture. The microcontroller may be connected to external ADCs, DACs and peak and phase detector modules. The ADC, DAC and QMS mass selector may be connected to the microcontroller over a serial bus, which may be a synchronous or asynchronous bus capable of unidirectional and/or bidirectional communication. One skilled in the art will recognize that any one of the available parallel bus architectures can be employed instead.

In yet another example, the FPGA 410 may encapsulate a soft core processor like the NIOS, POWERPC or ARM. In this embodiment, the FPGA 410 may be connected to external non-volatile memory including, but not limited to, NAND or NOR flash, in which resides the software program which executes on the software processor. In yet another embodiment, the software program executes in Random Access Memory (RAM) including, but not limited to, Static RAM (SRAM), Dynamic RAM (DRAM), and Dual Data Rate (DDR) RAM. In yet another embodiment, the FPGA stores configuration data in parallel Electrical Erasable Programmable Read-Only Memory (EEPROM) or serial EEPROM connected to the FPGA using, but not limited to, the SPI, I2C or 1-wire interface.

In yet another embodiment, the FPGA 410 is placed on a PCI plug in card, which is inserted into the PCI slot of a general purpose computer. In yet another embodiment, the FPGA reports operation data to the general purpose computer where it is recorded.

FIG. 5 is yet another example of a multi-resonant tank circuit control system 450, also simply referred to as the control system 450, that may be used to control the operation of a QMS 474 and more specifically enable energizing the quadrupole rods 468 of the QMS 474 with a composite RF signal comprising at least a first RF signal having fundamental frequency Ω and a second RF signal auxiliary frequency ω. As previously described, appropriate capacitive and inductive elements in an impedance network 466 are selected, such that first and second resonant frequencies of the tank circuit 470 correspond to the fundamental frequency Ω and the auxiliary frequency ω of the composite RF signal. In this example the multi-resonant tank circuit control system 450 is adapted with an input/output system 454 which permits “standalone” operation of the control system 450.

In this example, a user may provide a digital logic and control block 452 with information corresponding to the desired fundamental frequency Ω and auxiliary frequency ω via the input/output system 454. Separately, the user may also provide the peak or average signal level for the generated composite RF signal and the voltage level of the DC signal. As previously discussed, the digital logic and control block 452 may utilize the DDS block 456 to synthesize the RF signals having the desired fundamental frequency Ω and auxiliary frequency ω. The digital logic and control block 452 may determine appropriate values for capacitive and inductive elements in the impedance network 466 based on the user provided fundamental frequency Ω and auxiliary frequency ω. The digital logic and control block 452 may adjust capacitive and inductive elements in the impedance network 466 based on the determined values. Of course, the values determined would cause the resulting tank circuit 470 to have a first resonant frequency $f_0$ and a second resonant frequency $f_1$, where $f_0$ corresponds to fundamental frequency Ω and $f_1$ corresponds to auxiliary frequency ω.

In this example, the logic and control block 452 may periodically monitor the feedback signal 472 to determine, in part, a deviation in the first and/or second resonant frequency of the tank circuit 470. As previously mentioned, this deviation may occur due to variations in the functional characteristics of the capacitive and inductive elements in the impedance network 466. The logic and control block 452 may detect this deviation and adjust the values of the capacitive and inductive elements in the impedance network to ensure that the first resonant frequency $f_0$ is close or equal to fundamental frequency Ω of the RF signal and the second resonant frequency $f_1$ is close or equal to auxiliary frequency ω of the RF signal. The logic and control block 452 may be implemented in an FPGA in one example. In another example, the logic and control block 452 may comprise a microprocessor, or controller. In this example, portions of the functional aspects of the logic and control block 452 may be implemented as software instructions or programs. In this example, the software instructions may be stored in non-volatile storage (not shown) and executed from volatile (not shown) or non-volatile memory.

Next discussed are several methods and algorithms that may be implemented to allow for auxiliary parametric frequency excitation of a QMS adapted with a multi-resonant apparatus such the one described with reference to FIG. 2. The methods may be implemented as software objects adapted to execute on a soft core processor. The software objects may include software libraries, which implement FFT, IFFT adaptive feedback control routines, etc.

Figure 6:
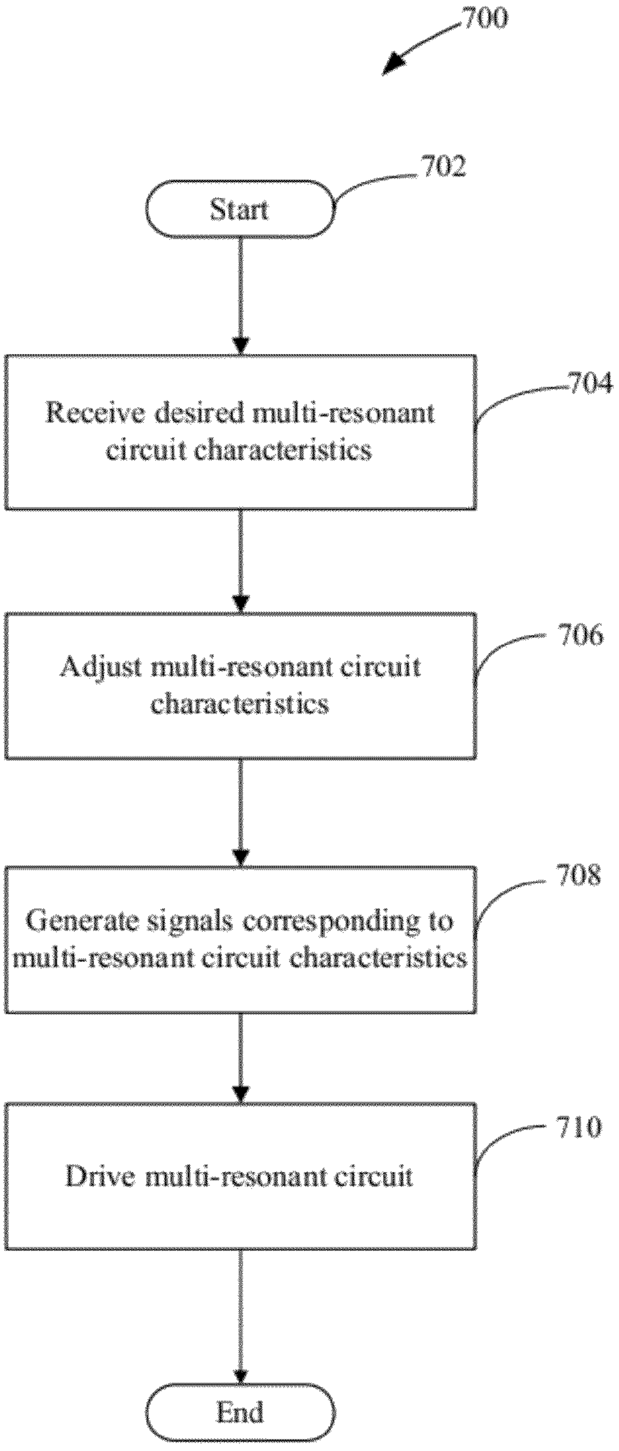
FIG. 6 is a flow diagram of an example method for producing auxiliary parametric frequency excitation of a QMS adapted with a multi-resonant apparatus.

FIG. 6 is a flow diagram of an example method 700 that may be implemented in the digital logic and control block 402 of the voltage control system 400 of FIG. 4 to produce auxiliary parametric frequency excitation of a QMS. As previously described, the voltage control system 400 is used, in part, to generate i) RF fundamental and auxiliary signals of the desired amplitude at frequency Ω and ω, and ii) DC voltage of the appropriate magnitude. By way of example and not by way of limitation, the several example blocks of method 700 are described with reference to the voltage control system 400 of FIG. 4. Although the foregoing discussion makes references to two frequencies (frequency Ω and ω) and two resonant frequencies (first and second resonant frequencies), the method may be implemented to cause auxiliary parametric frequency excitation of a QMS at more than two frequencies.

At block 702, an indication is received to initiate the generation of an RF fundamental and auxiliary signal. An indication corresponding to the desired DC voltage level (U) may also be received at block 702. The indication may correspond to user input received via the input/output system 404 of the voltage control system 400. The indication may include for example, the frequencies Ω and ω for the RF fundamental and auxiliary signals. The indication may also include the desired peak amplitude or signal strength of the RF fundamental and auxiliary signals. The desired frequencies Ω and ω may correspond to the first and second resonant frequency of the RC circuit 420, which comprises the tank circuit 416 and the capacitance $C_{qp}$ contributed by the QMS rods 418. Also included in the indication may be a relative phase difference between the RF fundamental and auxiliary signals.

As previously described, variations in electronic component values may cause drifts or changes in the first and second resonant frequencies of the RC circuit 420. To mitigate the effects of these variations, the method implemented at block 704 may adjust the values of the tank circuit 416 to align the first and second resonant frequencies of the RC circuit 420 with the desired frequencies Ω and ω for the RF fundamental and auxiliary signals. By utilizing the RF feedback 422, the method implemented at block 704 may perform a "closed-loop calibration" of the RC circuit 420. For example, the method implemented at block 704 may iteratively drive the RC circuit 420 with signals having a frequency Ω and ω and adjust component settings (a tunable capacitor or inductor, for example) of the tank circuit 416, to align the first and second resonant frequency of the RC circuit 420 with the frequency Ω and ω, respectively. The adjusted values of the component settings may be stored in non-volatile storage for future retrieval or calibration, for example. Of course, the method implemented at block 704 may utilize the DDS block 406 to synthesize signals having the frequencies Ω and ω, which may then be used to drive the RC circuit 420. The RF fundamental and auxiliary signals generated may be in phase or out of phase relative to each other. As previously mentioned, the phase difference may be received from the user at block 702 as a configuration parameter.

At block 706, the method 700 may configure the DDS block 704 to synthesize signals having frequencies of Ω and ω. Of course, the frequencies of the synthesized signals would be closely aligned to the first and second resonant frequencies of the RC circuit 420.

At block 708, the DAC 410 may be appropriately configured to generate the desired DC voltage (U). Also, the method implemented at block 708 may configure the DAC 410 to appropriately configure the amplitudes of the RF fundamental and auxiliary signals that are synthesized by the DDS block 406. The gain of the RF amplifier 414 and the DC amplifier 412 are adjusted to generate the desired DC voltage (U) and a composite signal comprising the RF fundamental and auxiliary signals having the desired RF voltage (V). In some scenarios, the method implemented at block 708 may perform closed-loop monitoring of the RF amplifier 414 and the DC amplifier 412 in part to stabilize the voltage levels. The signals generated at the output of the RF amplifier 414 and the DC amplifier 412 are used to drive the RC circuit 420, thereby causing excitation of the QMS rods 418 with i) the RF fundamental and auxiliary signals having frequencies of Ω and ω and ii) RF voltage level (V) and the DC voltage (U).

At block 710, the method may transmit to a master control (not shown) an indication that the QMS is configured. Of course, the method 700 may continue to perform closed-loop monitoring of the voltage control system 400.

Figure 7:
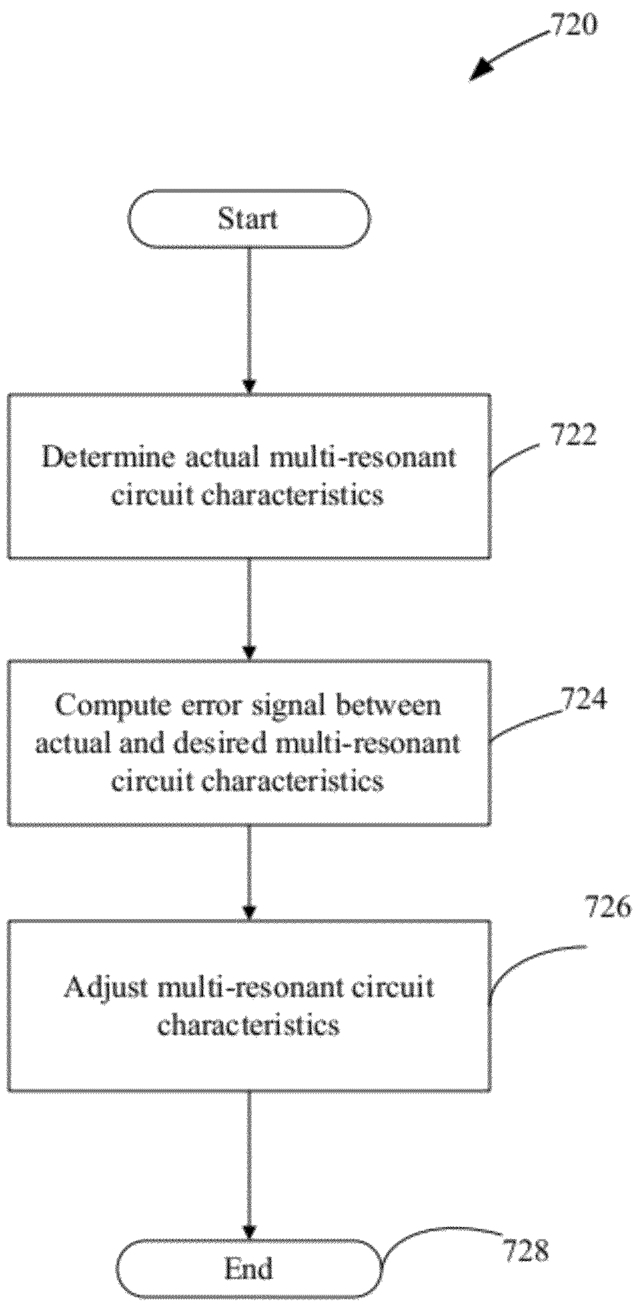
FIG. 7 is a flow diagram of an example method for tuning a QMS adapted with a multi-resonant apparatus.

FIG. 7 is a flow diagram of an example method 720 that may be implemented to perform periodic closed-loop tuning of a multi-resonant circuit. In some scenarios, the method 720 may be periodically initiated (timer expiration, for example). In other scenarios, a user may cause the "on-demand" execution of the method 720. Of course, any suitable means may be implemented to initiate the method 720. Referring to FIG. 4, the RC circuit 420 comprising the tank circuit 416 and the capacitance $C_{qp}$ of the QMS 418 is an example of such a multi-resonant circuit. The method 720 may, for example, be implemented in the digital logic and control block 402 of the voltage control system 400. The method 720 may be implemented to be performed in conjunction with the normal operation of the QMS. As previously discussed, during normal operation, the RC circuit 420 is excited with the synthesized RF fundamental and auxiliary signals having frequencies of Ω and ω and RF voltage level (V), and the DC voltage (U). In some scenarios, the method 720 may be periodically initiated (timer expiration, for example). In other scenarios, a user may cause the "on-demand" execution of the method 720 via the input/output system 404. Of course, any suitable means may be implemented to initiate the method 720.

At block 722, the resonant characteristics of the multi-resonant circuit may be determined. This step may be performed, for example, by initiating a "read back" of the RF feedback 422. The method may initiate a read back by causing the ADC 408 to digitize the signal received via the RF feedback 422. By selecting an appropriate sampling rate, the ADC 408 may be utilized to digitize a band of frequencies, which include the signals having the frequencies Ω and ω. Suitable IFFT algorithms may be implemented at block 722 to analyze the amplitudes of the digitized signal across a range of frequencies. The result of the analysis may include the amplitudes of the digitized signal at several frequencies including the frequencies Ω and ω.

At block 724, the amplitudes of the digitized signal may be analyzed to identify if the first and second resonant frequencies of the RC circuit 420 have drifted. The result of the analysis may include the generation of an indication corresponding to the error between the desired first and second resonant frequencies of the RC circuit 420 (frequencies Ω and ω) and the actual first and second resonant frequencies of the RC circuit 420. The drift may also cause a change in the relative phase difference between the RF signals. The peak and phase detector 417 of FIG. 4 may detect this change in phase.

The resulting error may be converted into an error signal at block 726. The error signal may be utilized to adjust component settings (a tunable capacitor or inductor, for example) of the tank circuit 416, to align the first and second resonant frequency of the RC circuit 420 with the frequency Ω and ω, respectively. The method implemented at block 726 may iteratively adjust component settings based on repeated digitization of the RF feedback 422 by the ADC 408, to minimize the error. Any phase difference detected by peak and phase detector 417 may be adjusted for as well.

While the present invention has been described with reference to specific examples, which are intended to be illustrative only and not to be limiting of the invention, it will be apparent to those of ordinary skill in the art that changes, additions, and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed:

1. A method of isolating a sample characterized by a characteristic atomic mass unit per charge value using a quadrupole assembly, the method comprising:

injecting the sample into the quadrupole assembly, where the quadrupole assembly is formed of two pairs of opposing quadrupole rods; and adjusting the impedance characteristic of the quadrupole rods to set a first resonant point and a second resonant point for the quadrupole assembly, such that the first resonant point substantially corresponds to a first resonant frequency of the quadrupole assembly and such that the second resonant point substantially corresponds to a second resonant frequency of the quadrupole assembly, wherein the second resonant frequency is different than first resonant frequency.

2. The method of claim 1, further comprising driving the quadrupole assembly at a drive excitation signal having components at the first resonant frequency and at the second resonant frequency.

3. The method of claim 2, wherein the second resonant frequency is substantially set at a resonant mode of the first resonant frequency.

4. The method of claim 2, wherein the first resonant frequency is Ω and the second resonant frequency is within the range of (n+0.9)*Ω to (n+1.1)*Ω, where n is a whole number.

5. The method of claim 4, wherein the second resonant frequency is at or near an integer multiple of the first resonant frequency.

6. The method of claim 2, further comprising adjusting either the amplitude of the drive excitation signal component at the first resonant frequency or the amplitude of the drive excitation signal component at the second resonant frequency.

7. The method of claim 6, further comprising adjusting the amplitude of the drive excitation signal component at the first resonant frequency and the amplitude of the drive excitation signal component at the second resonant frequency.

8. The method of claim 1, further comprising adjusting the amplitude of the drive excitation signal in response to a feedback signal indicating a frequency-dependent power usage level of the quadrupole assembly.

9. The method of claim 1, further comprising ionizing a precursor object to form the sample prior to injecting the sample into the quadrupole assembly.

10. An apparatus to control a Quadrupole Mass Spectrometer (QMS), the apparatus comprising:

an impedance network to receive a drive excitation signal to provide power to the QMS and to produce a frequency-dependent power usage level feedback signal; and a controller configured to transmit the drive excitation to the impedance network, wherein the controller is coupled to receive the frequency-dependent power usage level feedback signal and wherein the controller controls the amplitude component of the drive excitation signal.

11. The apparatus of claim 10, wherein the controller controls the frequency component of the drive excitation signal.

12. A method for energizing a multi-resonant tank circuit with a composite signal, the multi-resonant tank circuit comprising a plurality of components wherein the plurality of components include a multiplicity of capacitive elements and a plurality of inductive elements, the method comprising:

generating a first signal having a first frequency, wherein the first frequency corresponds to a first resonant frequency of the multi-resonant tank circuit, and wherein the first signal is generated from a clock source;

generating a second signal having a second frequency, wherein the second frequency corresponds to a second resonant frequency of the multi-resonant tank circuit, and wherein the second signal is generated from the clock source;

synthesizing a composite signal by utilizing the first signal and the second signal;

and coupling the composite signal to the multi-resonant tank circuit thereby causing the multi-resonant tank circuit to be energized at, at least the first resonant frequency and the second resonant frequency.

13. The method of claim 12, wherein a one of the multiplicity of capacitive elements corresponds to the intra-quadrupole rod capacitance of a Quadrupole Mass Spectrometer (QMS).

14. The method of claim 12, wherein the first signal is in phase with the second signal.

15. The method of claim 12, wherein the first signal is out of phase with the second signal.

16. The method of claim 12, wherein the first frequency is Ω and the second resonant frequency is within the range of (n+0.9)*Ω to (n+1.1)*Ω, where n is a whole number.

17. The method of claim 12, wherein an amplitude of the first signal and an amplitude of the second signal are configurable.

18. The method of claim 13, wherein the composite signal is coupled to the multi-resonant tank circuit via a primary coil of a transformer.

19. The method of claim 18, wherein a secondary coil of the transformer is a one of the plurality of inductive elements.

20. The method of claim 12, further comprising analyzing a feedback signal received from the multi-resonant tank circuit.

21. The method of claim 20, further comprising adjusting a one of the multiplicity of capacitive elements or a one of the plurality of inductive elements to cause the first resonant frequency of the multi-resonant tank circuit to be substantially equal to the first frequency and the second resonant frequency of the multi-resonant tank circuit to be substantially equal to the second frequency.

22. The method of claim 12, further comprises receiving an indication from a user for a first value for the first frequency and a second value for the second frequency.

23. The method of claim 22, further comprises adjusting a one of the multiplicity of capacitive elements or a one of the plurality of inductive elements to cause the first resonant frequency of the multi-resonant tank circuit to be substantially equal to the first value for the first frequency and the second resonant frequency of the multi-resonant tank circuit to be substantially equal to the second value for the second frequency.

* * * * *

UNITED STATES PATENT AND TRADEMARK OFFICE

CERTIFICATE OF CORRECTION

PATENT NO. : 8,487,249 B2
APPLICATION NO. : 13/326085
DATED : July 16, 2013
INVENTOR(S) : Daniel Gershman et al.

It is certified that error appears in the above-identified patent and that said Letters Patent is hereby corrected as shown below:

On the Title Page:

Item (73), "The Regents of the University of Michigan Office of Technology Transfer" should be -- The Regents of the University of Michigan --.

Signed and Sealed this
Twelfth Day of August, 2014

Michelle K. Lee
*Deputy Director of the United States Patent and Trademark Office*